(12) United States Patent
Bechtler et al.

(10) Patent No.: US 8,738,219 B2
(45) Date of Patent: May 27, 2014

(54) GOOD CHECKING FOR VEHICLE LONGITUDINAL ACCELERATION SENSOR

(75) Inventors: Henrik Bechtler, Stuttgart (DE); Ravi Bhadange, Farmington, MI (US); Nachiket Patil, Farmington Hills, MI (US); Takeshi Tokonaga, Yokohama (JP); Stefan Mallmann, Lauffen (DE); Michael Schwab, Korntal (DE); Dietmar Stapel, Sendenhorst (DE); Willy Klier, Bloomfield Hills, MI (US); Joerg Eesmann, Rheine (DE)

(73) Assignee: Robert Bosch GmbH, Stuttgart (DE)

( * ) Notice: Subject to any disclaimer, the term of this patent is extended or adjusted under 35 U.S.C. 154(b) by 147 days.

(21) Appl. No.: 12/860,370

(22) Filed: Aug. 20, 2010

(65) Prior Publication Data

US 2011/0066320 A1 Mar. 17, 2011

Related U.S. Application Data

(60) Provisional application No. 61/236,397, filed on Aug. 24, 2009.

(51) Int. Cl.
| | |
|---|---|
| *G01M 17/00* | (2006.01) |
| *G06F 11/30* | (2006.01) |
| *G06F 19/00* | (2011.01) |
| *G06F 7/00* | (2006.01) |
| *G07C 5/00* | (2006.01) |

(52) U.S. Cl.
USPC ........ 701/31.1; 701/29.7; 701/30.3; 701/30.9

(58) Field of Classification Search
USPC ................................ 73/1.37; 701/29.7–31.7
See application file for complete search history.

(56) References Cited

U.S. PATENT DOCUMENTS

| | | |
|---|---|---|
| 3,798,596 A | 3/1974 | Sumiyoshi et al. |
| 3,803,425 A | 4/1974 | Carp |
| 3,916,375 A | 10/1975 | Sumiyoshi et al. |
| 4,219,244 A | 8/1980 | Griner et al. |
| 4,233,599 A | 11/1980 | Brearley |
| 4,234,866 A | 11/1980 | Kuroda et al. |
| 4,379,520 A | 4/1983 | Tomsu |
| 4,395,677 A | 7/1983 | Petersdorf |

(Continued)

FOREIGN PATENT DOCUMENTS

| | | |
|---|---|---|
| DE | 19936596 | 1/2001 |
| EP | 1227019 | 7/2002 |

OTHER PUBLICATIONS

EP10173774 European Search Report dated Nov. 30, 2010, 5 pages.

(Continued)

*Primary Examiner* — Ryan Zeender
*Assistant Examiner* — Allen Chein
(74) *Attorney, Agent, or Firm* — Michael Best & Friedrich LLP (57) ABSTRACT

A controller for indicating whether a previously-detected, acceleration-sensor malfunction no longer exists. The controller includes an electronic memory and an electronic processing unit connected to the electronic memory. The electronic processing module includes a malfunction monitoring module, a failure handling module, and a signal checking module. The signal checking module performs a signal check after the malfunction monitoring module generates the fault signal. The signal check includes executing a signal check function with a longitudinal acceleration signal. Also disclosed is a vehicle including the controller, and a method executed by the controller.

16 Claims, 7 Drawing Sheets

(56) References Cited

U.S. PATENT DOCUMENTS

| | | | |
|---|---|---|---|
| 4,484,119 A | 11/1984 | Kerr | |
| 4,497,201 A | 2/1985 | Allen et al. | |
| 4,609,905 A | 9/1986 | Uzzo | |
| 4,648,662 A | 3/1987 | Fennel et al. | |
| 4,785,295 A | 11/1988 | Fukui et al. | |
| 4,839,811 A | 6/1989 | Kanegae et al. | |
| 4,886,291 A | 12/1989 | Okamoto | |
| 4,892,101 A | 1/1990 | Cheung et al. | |
| 4,934,474 A | 6/1990 | Sugasawa | |
| 4,953,652 A | 9/1990 | Ohmura et al. | |
| 4,961,144 A | 10/1990 | Yabe et al. | |
| 4,975,897 A | 12/1990 | Tanahashi | |
| 4,996,657 A | 2/1991 | Shiraishi et al. | |
| 5,008,823 A | 4/1991 | Takahashi | |
| 5,014,801 A | 5/1991 | Hirose | |
| 5,181,011 A | 1/1993 | Okano | |
| 5,186,153 A | 2/1993 | Steinbrenner et al. | |
| 5,190,522 A | 3/1993 | Wokcicki et al. | |
| 5,200,911 A | 4/1993 | Ishikawa et al. | |
| 5,201,380 A | 4/1993 | Callahan | |
| 5,271,475 A | 12/1993 | Takeshita | |
| 5,282,135 A | 1/1994 | Sato et al. | |
| 5,283,740 A | 2/1994 | Sato et al. | |
| 5,305,723 A | 4/1994 | Kadota | |
| 5,357,141 A | 10/1994 | Nitschke et al. | |
| 5,448,480 A | 9/1995 | Rauner et al. | |
| 5,457,632 A | 10/1995 | Tagawa et al. | |
| 5,473,147 A | 12/1995 | Hoshino et al. | |
| 5,481,906 A | 1/1996 | Nagayoshi et al. | |
| 5,532,476 A | 7/1996 | Mikan | |
| 5,544,073 A | 8/1996 | Piety et al. | |
| 5,564,429 A | 10/1996 | Bornn et al. | |
| 5,572,670 A | 11/1996 | Puckett | |
| 5,594,228 A | 1/1997 | Swartz et al. | |
| 5,636,121 A | 6/1997 | Tsuyama et al. | |
| 5,642,180 A | 6/1997 | Yoshida | |
| 5,671,981 A | 9/1997 | Sasaki et al. | |
| 5,696,690 A | 12/1997 | Richardson et al. | |
| 5,707,117 A | 1/1998 | Hu et al. | |
| 5,710,704 A | 1/1998 | Graber | |
| 5,712,784 A | 1/1998 | Fendt et al. | |
| 5,748,483 A | 5/1998 | Richardson et al. | |
| 5,752,208 A | 5/1998 | Lerner | |
| 5,899,948 A * | 5/1999 | Raphael et al. | 701/45 |
| 5,928,110 A * | 7/1999 | Vornehm et al. | 477/166 |
| 5,959,529 A | 9/1999 | Kail, IV | |
| 6,035,693 A | 3/2000 | Horiuchi | |
| 6,134,491 A | 10/2000 | Kawagoe et al. | |
| 6,144,904 A | 11/2000 | Tseng | |
| 6,198,988 B1 | 3/2001 | Tseng | |
| 6,212,465 B1 | 4/2001 | Sielagoski et al. | |
| 6,225,901 B1 | 5/2001 | Kail, IV | |
| 6,292,733 B1 | 9/2001 | Sugiyama et al. | |
| 6,301,536 B1 | 10/2001 | Vaessen et al. | |
| 6,305,760 B1 * | 10/2001 | Otake | 303/122.05 |
| 6,354,607 B1 | 3/2002 | Kawashima et al. | |
| 6,408,229 B1 | 6/2002 | Loudon et al. | |
| 6,427,102 B1 | 7/2002 | Ding | |
| 6,491,357 B2 * | 12/2002 | Holst | 303/122.03 |
| 6,502,025 B1 | 12/2002 | Kempen | |
| 6,519,515 B1 | 2/2003 | Baumann et al. | |
| 6,577,948 B1 | 6/2003 | Skellenger et al. | |
| 6,682,153 B2 | 1/2004 | Okai | |
| 6,834,221 B2 | 12/2004 | Jäger et al. | |
| 7,057,503 B2 | 6/2006 | Watson | |
| 7,058,490 B2 | 6/2006 | Kim | |
| 7,085,642 B2 | 8/2006 | Samuel et al. | |
| 7,191,041 B2 | 3/2007 | von Schwertfuehrer et al. | |
| 7,200,524 B2 | 4/2007 | Kang et al. | |
| 7,286,083 B2 | 10/2007 | Xie | |
| 7,823,986 B2 | 11/2010 | Ruffer et al. | |
| 8,155,823 B2 | 4/2012 | Itoh | |
| 8,159,945 B2 | 4/2012 | Muro et al. | |
| 8,260,516 B2 | 9/2012 | Bechtler et al. | |
| 2001/0044688 A1 | 11/2001 | Okita et al. | |
| 2001/0051845 A1 | 12/2001 | Itoh | |
| 2002/0075137 A1 | 6/2002 | Hofbeck et al. | |
| 2002/0101115 A1 | 8/2002 | Holst | |
| 2002/0113587 A1 | 8/2002 | Kim | |
| 2002/0189889 A1 | 12/2002 | Demerly | |
| 2003/0109939 A1 | 6/2003 | Burgdorf et al. | |
| 2003/0149540 A1 | 8/2003 | Kachel et al. | |
| 2004/0026148 A1 | 2/2004 | Matsuno | |
| 2004/0030474 A1 | 2/2004 | Samuel et al. | |
| 2004/0061500 A1 | 4/2004 | Lou et al. | |
| 2004/0243287 A1 | 12/2004 | Yanaka et al. | |
| 2005/0131602 A1 | 6/2005 | Souda | |
| 2005/0182555 A1 | 8/2005 | Yu et al. | |
| 2005/0228546 A1 | 10/2005 | Naik et al. | |
| 2006/0173584 A1 | 8/2006 | Einig et al. | |
| 2006/0181066 A1 | 8/2006 | Andres et al. | |
| 2007/0129871 A1 | 6/2007 | Post, II et al. | |
| 2007/0250183 A1 * | 10/2007 | Howell et al. | 700/20 |
| 2007/0279207 A1 | 12/2007 | Clark et al. | |
| 2007/0282558 A1 | 12/2007 | Sagisaka | |
| 2008/0059020 A1 | 3/2008 | Sato | |
| 2008/0097671 A1 | 4/2008 | Kojo et al. | |
| 2008/0176122 A1 | 7/2008 | Wake et al. | |
| 2008/0183350 A1 | 7/2008 | Noguchi | |
| 2008/0195275 A1 | 8/2008 | Kojo et al. | |
| 2008/0209992 A1 | 9/2008 | Murayama | |
| 2009/0055033 A1 | 2/2009 | Gansler et al. | |
| 2009/0069978 A1 | 3/2009 | Inage | |
| 2009/0164059 A1 | 6/2009 | Takeda | |
| 2010/0014302 A1 | 1/2010 | Okumura et al. | |
| 2010/0138105 A1 | 6/2010 | Shibasaki et al. | |
| 2010/0269500 A1 | 10/2010 | Ruffer et al. | |
| 2010/0274436 A1 | 10/2010 | Kodaka et al. | |
| 2011/0066319 A1 | 3/2011 | Bechtler et al. | |
| 2011/0066321 A1 | 3/2011 | Bechtler et al. | |
| 2011/0068913 A1 | 3/2011 | Bechtler et al. | |
| 2011/0071723 A1 | 3/2011 | Bechtler et al. | |
| 2011/0071726 A1 | 3/2011 | Bechtler et al. | |
| 2011/0071727 A1 | 3/2011 | Bechtler et al. | |

OTHER PUBLICATIONS

Office Action from the United States Patent and Trademark Office for U.S. Appl. No. 12/860,362 dated July 19, 2012 (23 pages).
Harland, David M., Lorenz, Ralph D., "Space Systems Failures", Springer Praxis Books, 2005, Part Two, 211-226, available at http://www.springerlink.com/content!n886138036412186/.
Office Action from the United States Patent and Trademark Office for U.S. Appl. No. 12/860,376 dated Aug. 3, 2012 (24 pages).
Notice of Allowance from the United States Patent and Trademark Office for U.S. Appl. No. 12/860,389 dated May 15, 2012 (8 pages).
Office Action from the United States Patent and Trademark Office for U.S. Appl. No. 12/860,407 dated Sep. 14, 2012 (18 pages).
Office Action from the United States Patent and Trademark Office for U.S. Appl. No. 12/860,418 dated Jul. 5, 2012 (23 pages).
EP10173775 European Search Report dated Feb. 18, 2013, 2 pages.
Notice of Allowance from the United States Patent and Trademark Office for U.S. Appl. No. 12/860,376 dated Dec. 17, 2012 (11 pages).
Notice of Allowance from the United States Patent and Trademark Office for U.S. Appl. No. 12/860,362 dated Feb. 21, 2013 (11 pages).
Office Action from the United States Patent and Trademark Office for U.S. Appl. No. 12/860,396 dated Mar. 6, 2013 (16 pages).
Final Rejection from the United States Patent and Trademark Office for U.S. Appl. No. 12/860,407 dated Feb. 21, 2013 (28 pages).
Notice of Allowance from the United States Patent and Trademark Office for U.S. Appl. No. 12/860,418 dated Feb. 22, 2013 (14 pages).
Final Rejection from the United States Patent and Trademark Office for U.S. Appl. No. 12/860,418 dated Dec. 6, 2012 (7 pages).
Final Rejection from the United States Patent and Trademark Office for U.S. Appl. No. 12/860,396 dated Jan. 2, 2014 (6 pages).
Final Rejection from the United States Patent and Trademark Office for U.S. Appl. No. 12/860,407 dated Feb. 21, 2014 (9 pages).

* cited by examiner

FIG. 10

GOOD CHECKING FOR VEHICLE LONGITUDINAL ACCELERATION SENSOR

RELATED APPLICATION

The present application claims the benefit of prior filed U.S. Provisional Patent Application No. 61/236,397 filed on Aug. 24, 2009, the entire content of which is hereby incorporated by reference.

This application is related to the following United States Patent Applications: United States Patent Applications: U.S. patent applications Ser. No. 12/860,362, filed on Aug. 20, 2010 entitled GOOD CHECKING FOR VEHICLE WHEEL SPEED SENSORS; and U.S. patent application Ser. No. 12/860,376, filed on Aug. 20, 2010 and entitled GOOD CHECKING FOR VEHICLE LATERAL ACCELERATION SENSOR; and U.S. patent application Ser. No. 12/860,389, filed on Aug. 20, 2010 and entitled GOOD CHECKING FOR VEHICLE BRAKE LIGHT SWITCH; and U.S. patent application Ser. No. 12/860,396, filed on Aug. 20, 2010 and entitled GOOD CHECKING FOR VEHICLE PRESSURE SENSOR; and U.S. patent application Ser. No. 12/860,407, filed on Aug. 20, 2010 and entitled GOOD CHECKING FOR VEHICLE STEERING ANGLE SENSOR; and U.S. patent application Ser. No. 12/860,418, filed on Aug. 20, 2010 and entitled GOOD CHECKING FOR VEHICLE YAW RATE SENSOR.

FIELD OF THE INVENTION

Embodiments of the invention relate to methods, systems, and controllers for indicating whether a malfunction no longer exists in a previously malfunctioning sensor, such as an acceleration sensor for a vehicle.

BACKGROUND

Today's vehicles include a large number of systems for controlling aspects of the vehicle including engine emissions, anti-lock braking, passenger restraints, and much more. Each of these systems requires information in order to function, such as wheel speed data, or vehicle acceleration data. This information is generally obtained from sensors located throughout the vehicle. To ensure the integrity of the information, controllers perform failure analysis and testing on the sensors and the signals or data the sensors provide. If an error is detected in the information transmitted from the sensor, a controller can implement an alternate operating state for the vehicle control module. The alternate operating state may ignore the faulty sensor or may turn off the vehicle control module entirely. The controller may also generate an error signal (e.g., a tell-tale indicator such as a "check engine" warning light) to inform the operator of the vehicle of the malfunction.

SUMMARY

While current vehicle systems are designed to monitor the functioning or operation of vehicle sensors and determine when a sensor malfunction occurs, such systems lack, at least in general, robust abilities for determining when the sensor malfunction ends. For example, a sensor malfunction might be caused by a powerful source of electromagnetic interference ("EMI"). Such a circumstance might occur if a vehicle passes near an electrical power generation plant, a radar or broadcast installation, or similar location. Once the vehicle moves outside the range of the EMI, the output from the sensor might return to within an acceptable range. However, in many vehicles, once a sensor malfunction occurs the only way in which the malfunction or error may be cleared is to have a mechanic or technician access the system, check its operation, and perform an act that resets the system or otherwise removes the error.

A check of the sensor signal based on a re-detection by the failure monitoring function can be used as a mechanism to determine if a sensor has returned to normal operation. However, good checking is more than this. In general, malfunction monitoring functions are designed to avoid misdetection. On the other hand, good check functions are, in general, designed to avoid a false good check, i.e., a good check function has smaller tolerances for deviations and fewer conditions on the driving situation to perform the evaluation. Or, in other words, the tolerances and conditions used in good checking are different than those used to detect a malfunction.

Embodiments of the invention provide a mechanism for automatically determining whether a malfunctioning sensor has returned to a normal or acceptable operating range. In the parlance of the inventors, embodiments of the invention perform a "good check" on the sensor to determine whether the sensor has returned to normal or acceptable operation after a malfunction has been detected. When a previously-malfunctioning sensor passes the "good check," warning lights (or tell-tale) indicators are shut off and systems that relied upon information from the malfunctioning sensor return to normal operation.

In one embodiment, the invention provides a controller for indicating whether a previously-detected, acceleration-sensor malfunction no longer exists. The controller includes an electronic memory and an electronic processing unit connected to the electronic memory. The electronic processing module includes a malfunction monitoring module, a failure handling module, and a signal checking module.

The malfunction monitoring module monitors the operation of an acceleration sensor and generates a fault signal when the acceleration sensor malfunctions. The fault signal contains fault information and causes a tell-tale indicator to be activated or a vehicle control module to modify its operation from a first operating state to a second state. The failure handling module stores the fault information and corresponding drive cycle information in the electronic memory.

The signal checking module performs a signal check after the malfunction monitoring module generates the fault signal. The signal check includes retrieving drive cycle information from the electronic memory, determining whether to execute a signal check function based on the drive cycle information, executing the signal check function with a longitudinal acceleration signal, determining whether the longitudinal acceleration signal passes the signal check function, and generating a reset signal when the longitudinal acceleration signal passes the signal check. The reset signal causes at least one of the tell-tale indicator to be deactivated or a vehicle control module to resume operation in the first operating state.

The acceleration sensor can be a single sensor or an acceleration sensor suite having one or more acceleration sensors and associated devices, such as filters, etc.

In some embodiments, the malfunction monitoring module monitors the operation of the acceleration sensor by detecting a fault with the longitudinal acceleration signal and generates the fault signal in response to the detection of the fault. Executing the signal check function includes comparing the longitudinal acceleration signal with a predetermined threshold. Comparing the longitudinal acceleration signal with the predetermined threshold further includes applying a value of the longitudinal acceleration signal to a filter to generate a filtered value, adjusting the filtered value by an offset to generate an adjusted value, and comparing the adjusted value to the predetermined threshold.

In some embodiments, the longitudinal acceleration signal includes an offset value. Executing the signal check function includes comparing the offset value with a predetermined threshold, the predetermined threshold being based on a distance value. Executing the signal check function further includes performing a plausibility check with the longitudinal acceleration signal. The plausibility check includes comparing a longitudinal acceleration value with a value having a relation to a velocity signal. The value having the relation to the velocity signal is based on a first order derivative value of the velocity signal, and wherein the comparison includes comparing the longitudinal acceleration value and the first order derivative value.

In some embodiments, the vehicle includes an acceleration sensor connected to the controller. The acceleration sensor includes a longitudinal acceleration sensor generating the longitudinal acceleration signal. The acceleration sensor consists of a longitudinal acceleration sensor generating the longitudinal acceleration signal.

In another embodiment, the invention provides a method executed by the controller including the electronic processing unit and an electronic memory. The malfunction monitoring module, failure handling module, and the good-signal checking module are executed by the electronic processing unit to result in the method.

In another embodiment, the invention provides a method, executed by a controller, including an electronic processing unit and an electronic memory, for determining whether a previously-detected, acceleration-sensor malfunction no longer exists. The method includes the steps of monitoring the operation of an acceleration sensor with a malfunction monitoring module executed by the electronic processing unit, generating a fault signal containing fault information with the malfunction monitoring module when the acceleration sensor malfunctions, causing, at least partially in response to the fault signal, at least one of a tell-tale indicator to be activated or a vehicle control module to modify its operation from a first operating state to a second operating state, storing drive cycle information and the fault information in the electronic memory with a failure handling module executed by the electronic processing unit, and performing a signal check after generating the fault signal with a signal checking module executed by the electronic processing unit. The signal check includes retrieving drive cycle information from the electronic memory, determining whether to execute a signal check function based on the drive cycle information, executing the signal check function with a longitudinal acceleration signal, determining whether the longitudinal acceleration signal passes the signal check function, generating a reset signal when the longitudinal acceleration signal passes the signal check, the reset signal causing at least one of the tell-tale indicator to be deactivated and a vehicle control module to resume operation in the first operating state.

In some embodiments, monitoring the operation of the acceleration sensor includes detecting a fault with the longitudinal acceleration signal and generating the fault signal based on the detection of the fault. Executing the signal check function includes comparing the longitudinal acceleration signal with a predetermined threshold. Comparing the longitudinal acceleration signal with the predetermined threshold further includes applying a longitudinal acceleration value of the longitudinal acceleration signal to a filter to generate a filtered value, adjusting the filtered value by an offset to generate an adjusted value, and comparing the adjusted value to the predetermined threshold. The longitudinal acceleration signal has longitudinal acceleration information including an offset value. Executing the signal check function includes comparing the offset value with the predetermined threshold, the predetermined threshold being based on a distance value. Executing the signal check function further includes performing a plausibility check with the longitudinal acceleration signal. The plausibility check includes comparing a longitudinal acceleration value with a value having a relation to a velocity signal. The value having the relation to the velocity signal is a derivative of the velocity signal, and wherein the comparison includes comparing the longitudinal acceleration value and the derivative.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

As should also be apparent to one of ordinary skill in the art, the systems shown in the figures are models or examples of what actual systems might be like. Many of the modules and logical structures described are capable of being implemented in software executed by a microprocessor or a similar device or of being implemented in hardware using a variety of components including, for example, application specific integrated circuits ("ASICs"). Furthermore, capitalized terms are used throughout the specification. Such terms are used to conform to common practices. However, no specific meaning is implied or should be inferred simply due to the use of capitalization.

Figure 1:
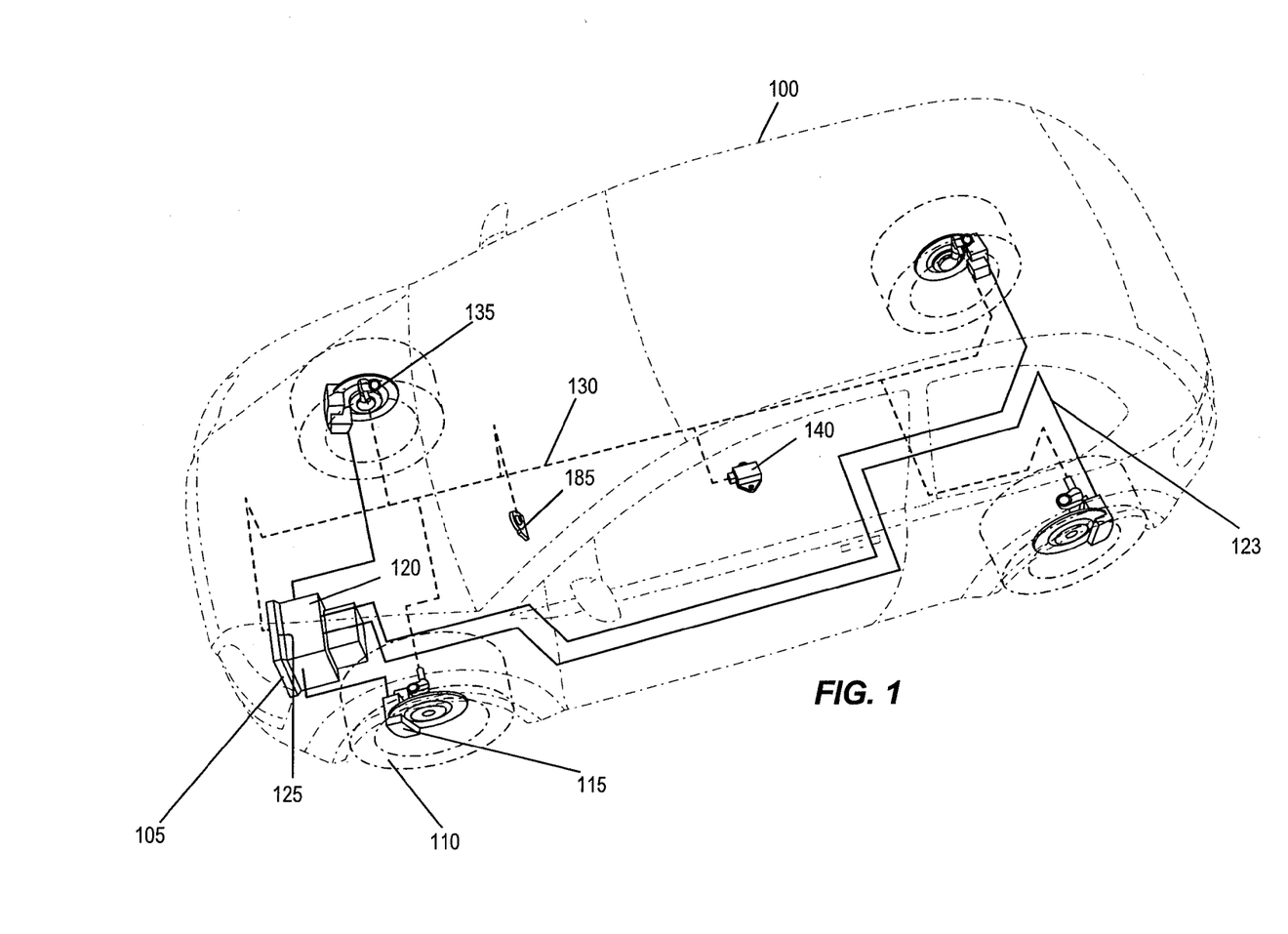
FIG. 1 is a perspective view of a vehicle including a portion of a vehicle control system according to one embodiment of the invention.

FIG. 1 illustrates a vehicle 100 including a vehicle control system 105 according to one embodiment of the invention. The vehicle 100 has wheels 110 driven by a power plant (e.g., an internal combustion engine, a hybrid engine, a fuel cell, etc.) as is conventionally known. The vehicle 100 further includes brakes 115 for braking the wheels 110 in response to a braking system. For example, the braking system can include a hydraulic brake controller 120, which is part of the vehicle control system 105, coupled to the brakes 115 via hydraulic lines 123. The hydraulic brake controller 120 is in communication with, for example, a braking control module (discussed below).

The vehicle 100 includes sensors and actuators (best shown in FIG. 2) coupled to a vehicle controller 125 of the vehicle control system 105. The vehicle controller 125 receives signals from the sensors over a controller area network ("CAN") and transmits signals to the actuators over the CAN bus 130. The signals include information such as instructions, data, codes, values (e.g., amplitude values, frequency values), events, states, and similar items, which may be communicated via signals (e.g., analog signals, digital signals) or stored in memory.

The vehicle controller 125 uses sensor information to determine what actions to take to maintain or improve the performance, stability, and safety of the vehicle 100. Exemplary sensors include wheel speed sensors 135 (FIG. 1), a steering angle sensor, an accelerator pedal sensor, a yaw rate sensor, and an acceleration sensor 140. Broadly speaking, a sensor senses a physical property (or parameter) and generates an electric signal correlated to or having information related to the parameter. For example, a wheel speed sensor 135 senses a rotational speed of a wheel 110 and communicates information related to the speed of the wheel 110. As another example, the acceleration sensor 140 senses an acceleration of the vehicle 100 and communicates information related to the acceleration of the vehicle 100. Exemplary information related to the acceleration of the vehicle 100 includes an acquired acceleration value and an offset value (discussed below). Therefore, it should be understood that the term "acceleration signal" refers to a signal communicating information related to the acceleration (such as an offset), not just an acceleration value.

Figure 2:
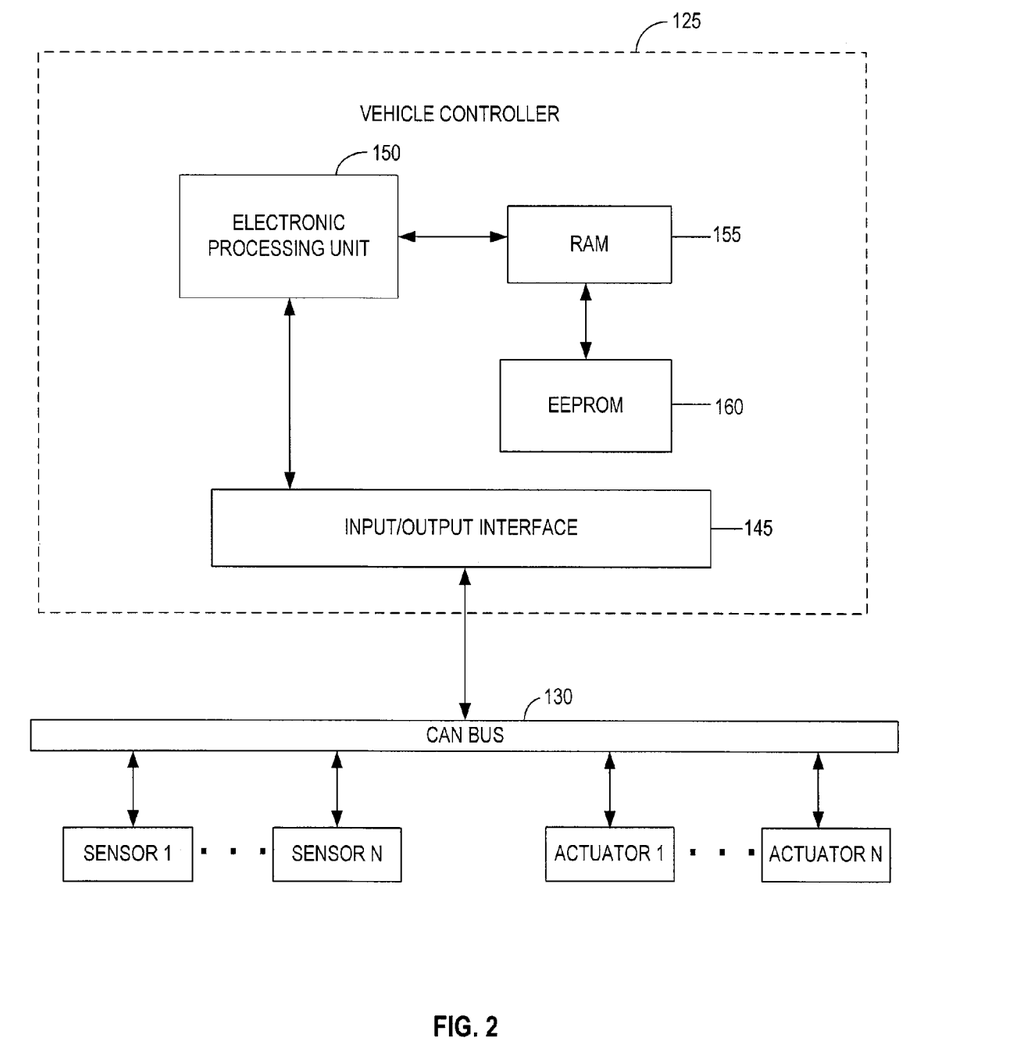
FIG. 2 schematically illustrates a portion of a vehicle control system according to one embodiment of the invention.

Referring to FIG. 2, the vehicle controller 125 includes an input/output interface 145, an electronic processing unit ("EPU") 150, and one or more electronic memories, such as a random access memory ("RAM") module 155 and an electronically erasable programmable read-only memory ("EEPROM") module 160. As shown in FIG. 2, the input/output interface 145 transmits and receives information over the CAN bus 130. The EPU 150 receives information from the input/output interface 145 and processes the information by executing one or more applications or modules. Exemplary modules include a braking control module, a traction control module, a passenger restraint control module, an electronic stability control (ESC) module, a malfunction monitoring module, a failure handling module, and a good-signal checking module. While the various modules are described as distinct modules, it should be understood that the modules can be integrated or incorporated with one another. For example, the ESC module may include or include aspects of the braking control module. It should also be noted that the information from the sensors can be received directly or indirectly from the sensors. That is, the information can be sent or delivered to a module via other vehicle systems and/or modules.

The electronic processing unit 150 transmits information via the input/output interface 145 to control a plurality of actuators. The actuators can be, for example, hydraulic pumps of the hydraulic brake controller 120, switches or motors used with occupant restraints in an occupant restraint system, or switches or control devices used with a visual display for communicating information to a user. Before proceeding further, it should be understood that the vehicle controller 125 can comprise multiple control devices, and other buses or networks can be used in place of or in addition to the CAN bus 130.

As an exemplary control module, the electronic stability control ("ESC") module utilizes several sensors to estimate a current "state" of the vehicle 100. The ESC module receives information from the sensors and sends information to, for example, the hydraulic brake controller 120. The ESC module receives information from, for example, a steering-wheel angle sensor, a yaw rate sensor, an acceleration sensor, and a wheel speed sensor. The ECU module detects circumstances that may affect the stability of the vehicle 100 or a driver's control of the vehicle 100. Based on the sensed information, the ESC system is capable of controlling various systems and functions within the vehicle 100 such as the braking control module, the traction control module, the passenger restraint module, etc.

The accuracy and timeliness of controlling various systems and functions of the vehicle 100 are factors in their effectiveness. However, the sensors coupled to the ESC module are subject to error and/or noise. The sensors used by the ESC module can be disturbed or corrupted by the environment of the vehicle 100. For example, the sensors (and, more particularly, the information they provide) can be disturbed or corrupted if the vehicle 100 is traveling uphill, downhill, or over bumpy terrain. For a specific example, an acceleration sensor for acquiring vehicle acceleration (e.g., a lateral acceleration, a longitudinal acceleration, a vertical acceleration) can be corrupted by the environment of the vehicle 100, when the vehicle 100 is traveling up a curvy hill. Various offsets can be estimated and used to compensate sensor signals to more accurately represent the state of the vehicle 100. For example, an exemplary system for calculating offsets is shown in U.S. patent application Ser. No. 12/271,490, entitled "System and Method for Compensating Sensor Signals," the entire content of which is incorporated herein by reference. The acceleration sensor offset is combined with a corrupted acceleration sensor signal to generate a compensated acceleration sensor signal. The compensated acceleration sensor signal is sent to the ECU of the ESC system.

The sensors can also be disturbed or corrupted by a fault with the sensor. For example, a sensor can also be disturbed or corrupted if the position of the sensor is not substantially ideal (e.g., the sensor moves slightly because of a loose fastener). For another example, a sensor can be by disturbed or corrupted if the sensor or an aspect of the sensor is broken or faulty. Moreover, white noise and sensor power fluctuations can also introduce additional errors to a sensor. As a result, the sensor may provide information to the ECU that cannot accurately represent the state of the vehicle 100. If the sensor has a fault that is unrelated to the operation of the vehicle 100 and cannot be properly compensated, then the sensor has a malfunction. A malfunction with the sensor can affect the performance, stability, and safety of the vehicle 100.

For a specific example, the ESC module requires a substantially accurate estimation or calculation of the longitudinal acceleration of the vehicle 100. The sensed longitudinal acceleration of the vehicle 100 is not always equivalent to the actual acceleration of the vehicle (e.g., the longitudinal acceleration can be affected by a vertical incline or decline), which can result in errors in the determinations made by the ESC module.

More specifically, the vehicle 100 includes an acceleration sensor 140 and a wheel sensor 135. In one implementation, the acceleration sensor 140 is a sensor suite that includes multiple accelerometers, each designed to measure a particular acceleration (such as lateral, longitudinal, vertical, etc.). The accelerometers can be mounted on the axle near the wheel, and can be in the vicinity of the wheel rotation speed sensors 135. The accelerometer may be a small, low-cost accelerometer including a MEMS (microelectromechanical system) accelerometer. Alternatively, the acceleration sensor 140 may be a single or multi-dimensional accelerometer mounted centrally in the vehicle 100. The sensor 140 shown in FIG. 1 is a three-dimensional accelerometer that acquires a lateral acceleration, a longitudinal acceleration, and a vertical acceleration.

The overall acceleration of the vehicle 100 is a summation of a vertical acceleration vector, a longitudinal acceleration vector, and a lateral acceleration vector. When the vehicle 100 is on level ground (i.e., no incline), the longitudinal acceleration sensor offset is equal to zero. If the vehicle 100 is at an incline, the acceleration measured by the acceleration sensor 110 is a vector sum of two components, one normal to the incline and one parallel to the incline. One longitudinal offset that the acceleration sensor experiences is approximately equal to the acceleration due to gravity multiplied by the sine of the incline (in degrees or radians). For example, a 20% incline is approximately equal to an 18° incline. An 18° incline results in an estimated acceleration sensor offset approximately equal to that shown in the equation below, where g=9.81 m/s².

$$(g) \cdot \sin(18°) = 3.03 \frac{m}{s^2}$$

A similar estimation can be made for a vehicle 100 that is traveling over ground with a 20% decline, but the angle of the decline is approximately equal to −18° and the acceleration sensor offset is, therefore, a negation of the 18° incline instance. The acceleration sensor offset is related to the vehicle acceleration component that is parallel to the incline. Further, a similar estimation can be made for other acceleration directions.

Before proceeding further, it should be understood that as used herein, the term "acceleration sensor," without modification, may refer to an acceleration sensor that provides an acceleration value in a specific dimension (e.g., a longitudinal acceleration sensor or a longitudinal acceleration sensor) or an acceleration sensor suite including multiple acceleration sensors (e.g., multiple accelerometers).

Figure 3:
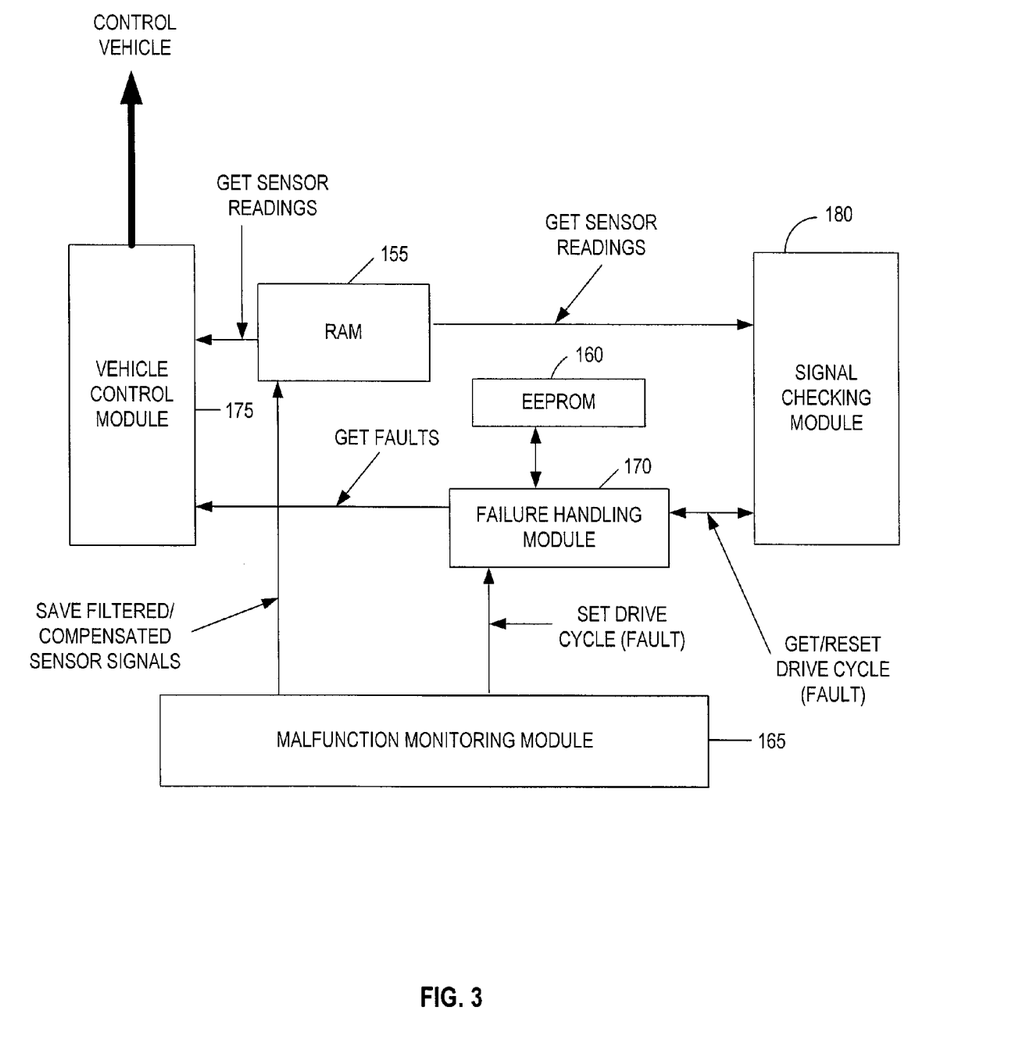
FIG. 3 schematically illustrates the functional operation of various components and modules of the vehicle control system of FIG. 2.

FIG. 3 illustrates the functional operation of applications or modules executed by the EPU 150 (FIG. 2) according to one implementation. The EPU 150 executes a malfunction monitoring module 165, a failure handling module 170, a vehicle control module 175 (e.g., the ESC module), and a signal checking module 180. The malfunction monitoring module 165 receives sensor signals from the sensors over the bus 130 (e.g., through the input/output interface 145 of FIG. 2) and saves sensor information into memory (e.g., RAM 155). The malfunction monitoring module 165 saves sensor information in a number of different ways. Depending on the particular embodiment, it saves raw sensor information, filtered sensor information, compensated sensor information, or a combination of the same to memory. For example, the acceleration sensor 140 may become dirty or damaged, which can affect the operation of the sensor 140. The malfunction monitoring module 165 can apply an offset (positive or negative) to a signal received from a particular sensor to compensate for the sensor's deterioration and stores the compensated sensor value to memory. In some implementations, if a particular sensor's offset gets too large (in either the positive or the negative direction), the malfunction monitoring module 165 may determine that the sensor is malfunctioning and may generate a fault signal. Based on faults detected by the malfunction monitoring module 165, the vehicle control module 175 may change one or more tell-tale indicators (or warning lights) in the vehicle 100 (e.g., on the vehicle's dashboard). The tell-tale indicator 185 (FIG. 1) alerts the operator of the faulty sensor. The vehicle control module 175 may also modify its operation of a particular control system or process. For example, if a particular sensor is malfunctioning, the vehicle control module 175 may change its ESC operation from a first operating state (e.g., fully functional) to a second operating state (e.g., inactive). It should be understood that the malfunction monitoring module 165 may also store other information to memory, such as fault information, offset information, and/or other statistical information about particular sensors.

Referring again to FIG. 3, when the malfunction monitoring module 165 detects a malfunctioning or faulty sensor, the module 165 generates a fault signal and sends the fault signal to the failure handling module 170. The fault signal includes fault information based on the particular fault or malfunction observed by the malfunction monitoring module 165. The failure handling module 170 stores the fault information and corresponding counter or cycle information (referred to as "drive cycle" information) in memory (e.g., the EEPROM 160). The drive cycle information helps to indicate what signal check functions (discussed below) should be performed by the signal checking module 180 during the next drive cycle. For example, if the malfunction monitoring module 165 detects that the acceleration sensor 140 is malfunctioning and generates a fault signal, the failure handling module 170 saves drive cycle information to memory indicating that the signal checking module 180 should check the acceleration sensor 140 during subsequent operation of the vehicle 100.

As shown in FIG. 3, the vehicle control module 175 requests the currently-detected faults from the failure handling module 170. The failure handling module 170 retrieves the stored fault information from memory (e.g., the EEPROM 160) and sends the fault information to the vehicle control module 175. In other implementations, however, the vehicle control module 175 obtains currently-detected faults from the malfunction monitoring module 165, memory, the bus 130, or other components included in the system 105.

After the vehicle control module 175 obtains the currently-detected faults, it determines how to handle the faults. In some implementations, the vehicle control module 175 activates one or more tell-tale indicators 185 in the vehicle 100 (e.g., on the vehicle's dashboard) in response to the currently-detected faults. The warning lights alert the vehicle operator of the one or more faulty sensors detected by the malfunction monitoring module 165. In other implementations, the vehicle control module 175 modifies its operation of a particular control module or process, such as ESC functionality, in response to the detected faults. For example, if a particular sensor is malfunctioning, the vehicle control module 175 may change its ESC operation from a first operating state to a second operating state. In some implementations, the first operating state includes a fully active state where the vehicle control module 175 considers substantially all information from substantially all sensors 20. The second operating state can include an intermediate functional state where the vehicle control module 175 ignores sensor information from one or more particular malfunctioning sensors, but continues to perform ESC functionality. Alternatively, the second operating state can include a deactivated state. For example, in some implementations, the vehicle control module 175 deactivates its ESC functionality if one or more "important" sensors are malfunctioning, causing a lack of proper information for the ESC to function properly. If the vehicle control module 175 deactivates its ESC functionality or other types of vehicle control or monitoring functionality, then the vehicle control module 175 can activate one or more warning lights that warn the vehicle operator of the modified operating state.

As shown in FIG. 3, if the vehicle control module 175 continues to operate the ESC functionality (e.g., continues to monitor for uncontrolled skids), the vehicle control module 175 obtains sensor readings from memory (e.g., RAM 155). In some implementations, the vehicle control module 175 can additionally or alternatively obtain sensor readings from the malfunction monitoring module 165, the bus 130, or both. If the module 175 is ignoring particular sensor information based on currently-detected faults, then it does not need to request this sensor information or can simply ignore any such sensor information received from memory, the malfunction monitoring module 165, the bus 130, or both.

The signal checking module 180 performs various signal checks to determine whether a previously-detected sensor malfunction no longer exists. As shown in FIG. 3, the signal checking module 180 retrieves drive cycle information stored in memory. In some implementations, the signal checking module 180 is initialized during each new ignition cycle and retrieves the stored drive cycle information upon each initialization. In other implementations, the signal checking module 180 retrieves stored drive cycle information from the memory at various times while the controller 105 is operating and the signal checking module 180 performs signal checks based on the stored drive cycle information continuously, at predetermined intervals, or at designated time (e.g., a next ignition cycle).

As described below with respect to FIGS. 5-10, after the signal checking module 180 retrieves stored drive cycle information from memory, the module 180 executes one or more signal check functions to determine whether a previously-detected fault still exists. As part of executing signal check functions, the signal checking module 180 retrieves sensor information from memory. In other implementations, the signal checking module 180 retrieves sensor information or readings from the malfunction monitoring module 165 and/or the bus 130. The sensor information can include compensated or filtered sensor information (e.g., values), raw sensor information, sensor offsets, and/or other statistical information about a particular sensor. The signal checking module 180 uses the sensor information to determine whether a previously-detected malfunction no longer exists. In some implementations, the signal checking module 180 retrieves sensor information from the previously-detected malfunctioning sensor. In other implementations, the signal checking module 180 also retrieves sensor information from sensors other than the previously-detected malfunctioning sensor. For example, the signal checking module 180 can use information from functioning sensors to determine whether a previously-detected malfunction or sensor reading is implausible.

If the signal checking module 180 performs one or more signal check functions related to a particular previously-detected fault and determines that the fault no longer exists, the signal checking module 180 resets the corresponding fault information, drive cycle information, or both in memory to indicate that the previously-detected fault no longer exists. In the examples herein, the signal checking module 180 resets the drive cycle information by generating a reset signal. The failure handling module 170 receives the reset signal and updates the fault information and/or drive cycle information stored in memory to indicate that the previously-detected fault no longer exists. When the vehicle control system 175 subsequently requests the current faults from the failure handling module 170, the failure handling module 170 informs the vehicle control module 175 that the previously-detected fault no longer exists. The vehicle control module re-assesses the current faults and, in some implementations, changes a previously-activated tell-tale indicator 185 within the vehicle 100, returns its operation back to a first or original operating state (e.g., a fully active and functional state), or both.

If the signal checking module 180 performs one or more signal check functions related to a particular previously-detected fault and determines that the fault still exists, the signal checking module 180 sets the corresponding fault and/or drive cycle information in memory, similar to how the malfunction monitoring module 165 sets the drive cycle information when it detects a fault. By setting the corresponding fault and/or drive cycle information in memory, the signal checking module 180 ensures that the fault information and/or drive cycle information stored in memory will continue to indicate that the fault exists so that (1) the vehicle control module 175 is informed of the existence of the fault and (2) the signal checking module 180 runs another signal check on the fault during subsequent operation. In some implementations, the signal checking module 180 sets the fault and/or drive cycle information by generating a set signal. The failure handling module 170 receives the set signal and ensures that the fault information and/or drive cycle information in memory continues to indicate that the previously-detected fault still exists. In other implementations, the signal checking module 180 simply fails to reset the fault and/or drive cycle information, which retains the fault and/or drive cycle information in the same condition as before the signal checking module 180 performed the required signal check functions.

Figure 4:
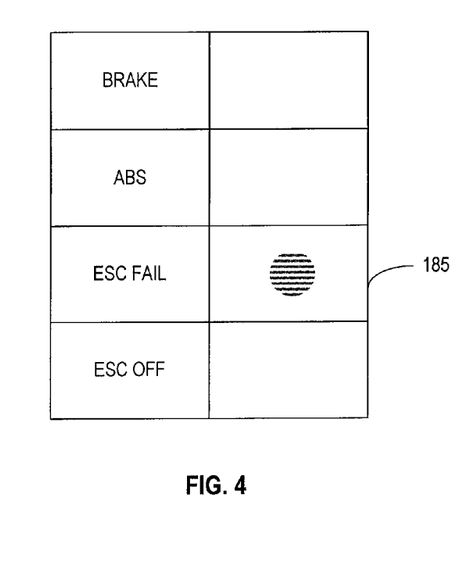
FIG. 4 is a flow chart illustrating a longitudinal acceleration sensor, long term compensation offset signal check performed by the signal checking module of FIG. 3.

FIG. 4 illustrates a first longitudinal acceleration sensor (AXS) signal check 200 according to one implementation. An offset, such as a long term compensation offset, can be applied to the AXS signal to compensate for misalignments and minor offset failures of the AXS. However, if the offset becomes too large, then a malfunction may be identified by the malfunction monitoring module 165. As shown in FIG. 4, the signal checking module 180 obtains the stored fault and/or drive cycle information and determines whether the retrieved information includes drive cycle information for a first AXS malfunction (step 205). The retrieved drive information can include a flag or bit (e.g., a first AXS drive cycle bit or flag) that is set if the first AXS malfunction is detected by the malfunction monitoring module 165. If this flag is set, the signal checking module 180 executes a first AXS signal check function 210. If this flag is not set, the signal checking module 180 checks for other flags, exits the signal check 180, or executes other signal checks.

Figure 5:
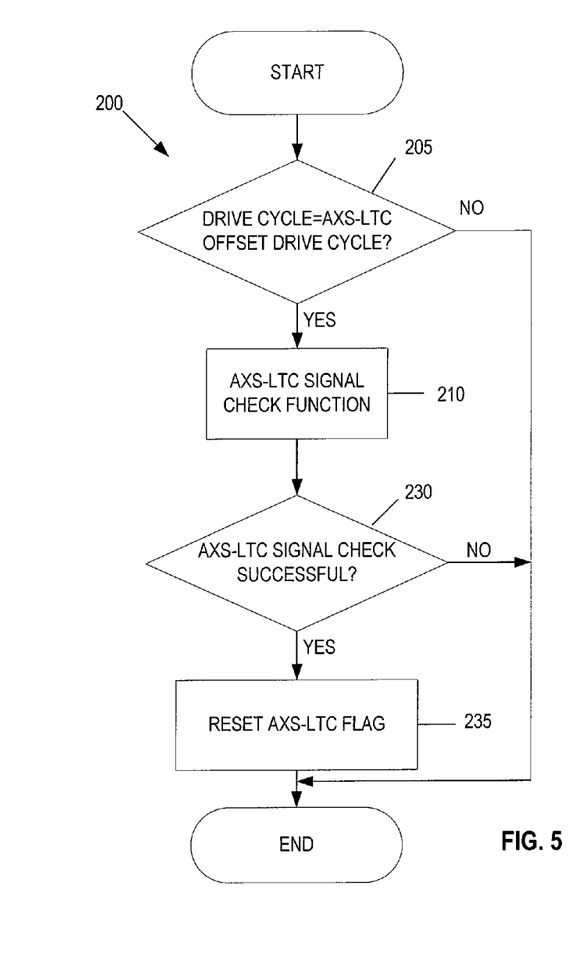
FIG. 5 is a flow chart illustrating a longitudinal acceleration sensor, long term compensation offset signal check function performed by the signal checking module of FIG. 3.

Generally, the first AXS signal check function 210 determines whether the AXS offset is less than one or more thresholds, which can be based on a distance traveled by the vehicle 100. The first AXS signal check function 210 determines whether a malfunction exists based on whether the AXS offset falls within a predetermined range and the vehicle has traveled more than a predetermined, threshold distance. As shown in FIG. 5, the signal checking module 210 begins the first AXS signal check function 210 by determining whether an absolute value of the AXS offset is less than a first threshold (e.g., 0-20 m/s²) (step 215). The first threshold can be based on a first distance traveled by the vehicle 100 (e.g., 0-50 km). The first threshold is typically less than (or tighter) than a maximum threshold (e.g., 0-20 m/s²) for a related maximum distance (e.g., 0-200 km).

If the signal checking module 180 determines that the AXS offset is less than the first threshold for the first distance, the signal check function 210 proceeds to step 220. In the implementation shown, the signal check function 210 includes a third AXS signal check (discussed below). If the third AXS signal check is successful, then the signal checking module 180 sets a first AXS signal check flag as successful (step 225). Otherwise, the signal checking module 180 exits the first AXS signal check function 210, which indicates that the function did not produce a successful result.

Referring again to FIG. 5, the first AXS signal check function 210 determines whether an absolute value of the AXS offset is less than a second threshold (e.g., 0-20 m/s² and greater than the first threshold) (step 228). The second threshold can be based on a second distance traveled by the vehicle 100 (e.g., 0-200 km and greater than the first distance). If the signal checking module 180 determines that the AXS offset is less than the second threshold for the second distance, the signal check function 210 proceeds to step 220. Otherwise, the signal checking module 180 exits the first AXS signal check function 210, thereby indicating the function did not have a successful result.

If the signal checking module 180 determines that the first AXS malfunction no longer exists (i.e., the first AXS signal check function is successful (step 230)), the signal checking module 180 resets the first AXS signal check flag (step 235). With the flag reset, the failure handling module 170 ensures that the fault information and/or drive cycle information stored in memory no longer indicates that the first AXS malfunction exists. Based on this updated information, the vehicle control module 175 changes the tell-tale indicator, modifies its operation back to the first or original operating state, or both. As shown in FIG. 4, after resetting the first AXS signal check flag at step 235, the signal checking module 180 exits the first AXS signal check 200. In some implementations, after exiting the first AXS signal check 200, the signal checking module 180 executes other signal checks.

If the signal checking module 180 determines that the first AXS malfunction still exists (i.e., fails step 210), the failure handling module 170 ensures that the fault information or drive cycle information stored in memory continues to indicate that the first AXS malfunction exists. In some implementations, the signal checking module 180 performs the first AXS signal check function 200 only during certain driving maneuvers or patterns. For example, the signal checking module 180 executes the first AXS signal check 200 when the vehicle 100 is traveling in a forward direction on a substantially straight path.

As noted above, the signal checking module 180 can execute a variety of signal checks and signal check functions for various malfunctions and combinations of malfunctions detected by the malfunction monitoring module 165. For example, the acceleration sensor 140 may experience an acceleration sensor range malfunction, which occurs when the longitudinal acceleration sensor range is greater than a threshold, for example.

Figure 6:
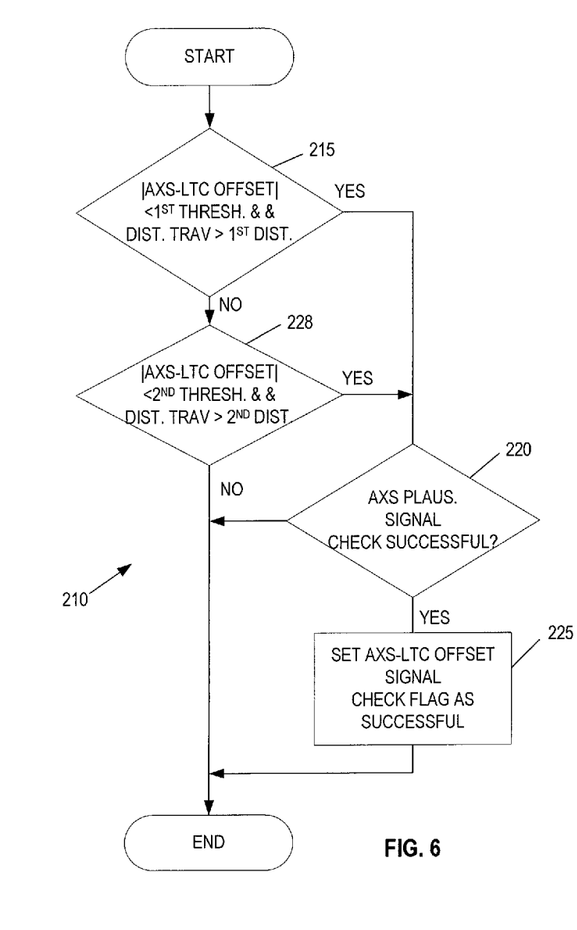
FIG. 6 is a flow chart illustrating a longitudinal acceleration sensor range signal check performed by the signal checking module of FIG. 3.

FIG. 6 illustrates a second longitudinal acceleration sensor (AXS) signal check 300 according to one implementation. The signal checking module 180 obtains the stored fault and/or drive cycle information and determines whether the retrieved information includes drive cycle information for a second AXS malfunction (step 305). The retrieved drive information can include a flag or bit (e.g., an AXS range drive cycle bit or flag) that is set if the AXS range malfunction is detected by the malfunction monitoring module 165. If this flag is set, the signal checking module 180 executes an AXS range signal check function 310. If this flag is not set, the signal checking module 180 checks for other flags, exits the signal check 180, or executes other signal checks.

Figure 7:
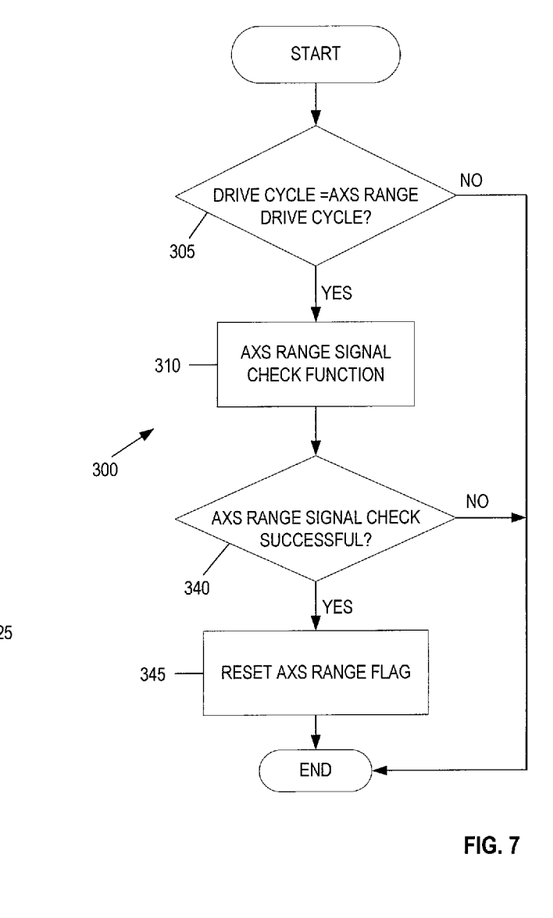
FIG. 7 is a flow chart illustrating a longitudinal acceleration sensor range signal check function performed by the signal checking module of FIG. 3.

Generally, the second AXS signal check function 310 determines whether a value related to the acquired acceleration value of the AXS is less than a threshold for an amount of time. For example, as shown in FIG. 7, the signal checking module 180 begins the second AXS signal check function 310 by applying the acquired longitudinal acceleration from the acceleration sensor 140 to a filter, and then, applying the long term compensation offset to the filtered value (step 315). The result is a value referred to herein as the AXS range value. Step 315 then compares the absolute value of the resulting difference value to a threshold (e.g., 0-20 m/s²).

If the signal checking module 180 determines that the AXS range value is greater than the threshold, thereby signifying that the AXS range value is to large enough to remove the malfunction warning, then the second AXS signal check function 310 proceeds to step 320. At step 320, the second AXS signal check function 310 resets a timer (discussed below).

Returning to step 315, the signal check function 310 proceeds to step 325 if the AXS range value is less than the threshold. At step 325, the signal check function 310 determines whether a timer (or counter) is greater than a period (e.g., 0-60 s). The period (or count) indicates that the AXS range value has been less than the threshold for the period. The signal check function 310 proceeds to increase the timer by an amount (e.g., a time) since the previous second AXS signal check function 310 (step 330). If the period indicates that the AXS range value has been less than the threshold for at least the period, then the signal check function 310 sets the second AXS flag as successful (step 335). The signal check module exits the second AXS signal check function after any one of steps 320, 330, or 335.

If the signal checking module 180 determines that the malfunction for the AXS range signal no longer exists (i.e., the second AXS signal check function is successful (step 340)), the module 180 resets the second AXS signal check flag (step 345). With the flag reset, the failure handling module 170 ensures that the fault information and/or drive cycle information stored memory no longer indicates that an AXS range malfunction exists. Based on this updated information, the vehicle control module 175 changes a tell-tale indicator, returns to the first or original operating state, or both. As shown in FIG. 6, after resetting the AXS range check flag at step 345, the signal checking module exits the second AXS signal check 300. In some implementations, after exiting the second AXS signal check 300, the signal checking module 180 executes other signal checks.

If the signal checking module 180 determines that the second AXS malfunction still exists (i.e., fails step 310), the failure handling module 170 ensures that the fault information or drive cycle information stored in memory continues to indicate that the second AXS malfunction exists.

In some implementations, the signal checking module 180 performs the second AXS signal check 300 during certain driving maneuvers or patterns. For example, the signal checking module 180 can execute the AXS range signal check 300 when the vehicle 100 is traveling in a forward direction on a substantially straight path, or is in a standstill. The second AXS signal check function 310 verifies that no implausibly large offset is present on the signal. That is, the absolute value for the longitudinal acceleration offset has to be within a physically plausible range for a certain minimum time.

Another example of the signal checking module 180 executing a different signal check and signal check function is the third AXS signal check, which will now be discussed. In one implementation, the third AXS signal check is performed as a distinct signal check, and in another implementation, is part of the first AXS signal check (discussed above). For the third AXS signal check, the acceleration sensor 140 may have a malfunction, but passes other signal checks. That is, the acceleration sensor 140 appears to have a valid signal prior to the third AXS signal check. The third AXS signal check compares a value related to the acquired acceleration signal with a value calculated from a wheel speed sensor, thereby determining whether the longitudinal acceleration signal is plausible.

Figure 8:
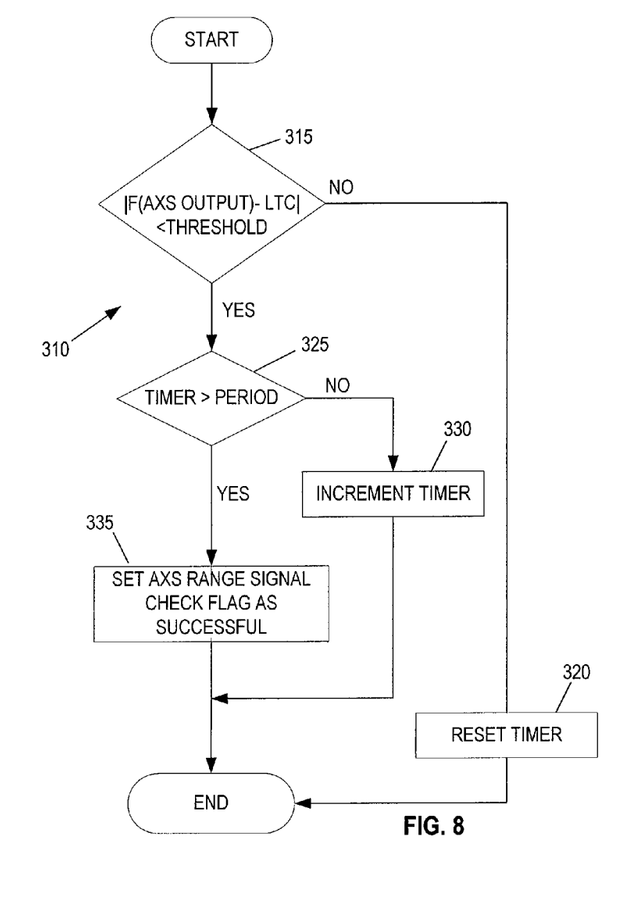
FIG. 8 is a flow chart illustrating a longitudinal acceleration sensor plausibility signal check performed by the signal checking module of FIG. 3.

For example, FIG. 8 illustrates one implementation of a third AXS signal check 400 performed by the signal checking module 130. When the malfunction monitoring module 165 detects a malfunction with the longitudinal acceleration signal because the value or sign is not plausible, the module 165 generates a fault signal and the failure handling module 170 stores fault information and drive cycle information in memory. The vehicle control system 175 obtains the fault information from the failure handling module 170 and activates one or more tell-tale indicators and/or modifies operation of a vehicle control module (e.g., the ESC module).

As also described above with respect to FIG. 3, the signal checking module 180 also uses the stored fault and/or drive cycle information to execute a signal check, such as a third AXS signal check 400. FIG. 8 illustrates a third AXS signal check 400 according to one implementation. As shown in FIG. 8, the signal checking module 180 obtains the stored fault and/or drive cycle information and determines whether the retrieved information includes drive cycle information for a third AXS malfunction (step 405). In some implementations, the retrieved drive information can include a flag or bit (e.g., a third AXS drive cycle bit or flag) that is set if a third AXS malfunction is detected by the malfunction monitoring module 165. If this flag is set, the signal checking module 180 can execute a third AXS signal check function (step 410). If this flag is not set, the signal checking module 180 can check for other flags, exit the signal check, and/or execute other signal checks.

Figure 9:
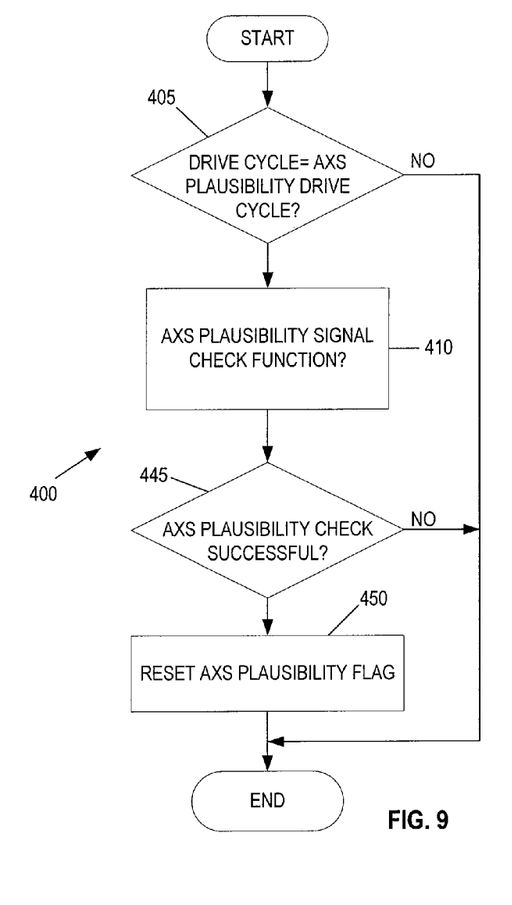
FIG. 9 is a flow chart illustrating a longitudinal acceleration sensor plausibility signal check function performed by the signal checking module of FIG. 3.
Figure 10:
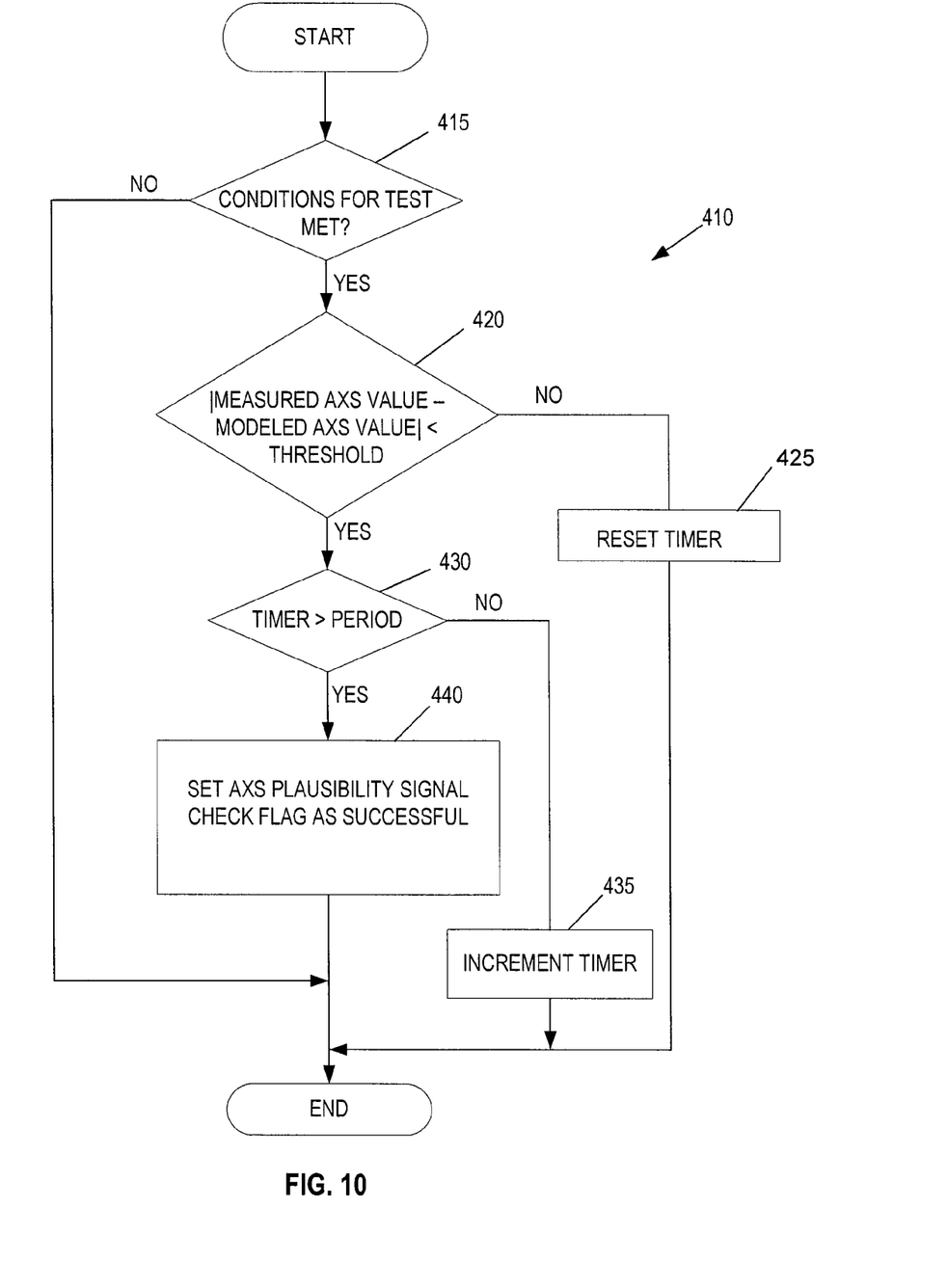

FIG. 9 illustrates the third AXS signal check function 410 according to one implementation. Generally, the third AXS signal check function verifies that the AXS signal exhibits a plausible value, offset, and sign. For example, the signal checking module 180 compares the AXS signal with a model of the AXS signal calculated from a velocity of the vehicle 100. If the AXS signal is plausible, the AXS signal is released to the vehicle control module, thereby reducing controller mis-interventions.

At step 415, the signal checking module 180 determines whether various conditions are fulfilled to perform a proper third AXS signal check function 410. Some exemplary conditions include a lack of wheel speed sensor faults, no controller (e.g., ESC) inventions are being performed, the vehicle 100 is moving in the forward direction at a speed greater than a threshold (e.g., 0-100 km/h,) and the modeled longitudinal acceleration is greater than a second threshold (e.g., 0-20 m/s$^2$). If the conditions are met, then the signal checking module 180 proceeds to step 420; otherwise the module 410 exits the third AXS check function 410.

At step 420, the signal checking module compares the difference between a measured longitudinal acceleration signal and a modeled longitudinal acceleration signal. The measured longitudinal acceleration signal is obtained from the acceleration sensor 140, and the offset can be applied to a sensed, filtered value. The modeled longitudinal acceleration signal is indirectly obtained from the wheel sensors 135 by performing a mathematical derivative on the speed signal(s).

The measured longitudinal acceleration value is compared to the modeled longitudinal acceleration value to generate a difference value. The check function 420 then compares an absolute value of the difference value with a threshold (e.g., 0-20 m/s$^2$) to determine if the longitudinal AXS signal is plausible. The comparison for step 420 looks for failures with 1) the sensed longitudinal AXS value, 2) the offset value applied to the longitudinal AXS value, and 3) the sign of the sensed longitudinal AXS value. If the sensed value, offset value, and sign are plausible, then the check function 420 proceeds to step 430. Otherwise, the signal checking module 180 proceeds to step 425.

In some implementations, the signal checking module 180 uses a timer or counter to determine whether the third AXS signal check is satisfied for a count or time period. At step 430, the signal check function 410 determines whether the timer (or counter) is greater than the period (e.g., 500 ms). The signal check function 310 proceeds to increase the timer by an amount (e.g., a time) if the period is not met (step 435). If the timer indicates that the third AXS check has been less than the threshold for at least the period, then the signal check function 310 sets the third AXS check flag as successful (step 440). The signal check module exits the third AXS check function after any one of steps 425, 435, or 440.

If the signal checking module 180 determines that the malfunction for the plausibility of the AXS signal no longer exists (i.e., the third AXS signal check function is successful (step 445)), the signal checking module 180 resets a third AXS signal check flag (step 450). The failure handling module 170 ensures that the fault information and/or drive cycle information stored in memory no longer indicates that a third AXS malfunction exists. Based on this updated information, the vehicle control module 175 changes the tell-tale indicators, restores its operation to an original state, or both. As shown in FIG. 8, after resetting the third AXS signal flag at step 450, the signal checking module exits the third AXS signal check 400. In some implementations, after exiting the third AXS signal check 200, the signal checking module 180 executes other signal checks.

If the signal checking module 180 determines that the third AXS malfunction still exists (i.e., fails step 410), the failure handling module 170 ensures that the fault information or drive cycle information stored in memory continues to indicate that the third AXS malfunction exists.

Thus, the invention provides, among other things, a controller for determining whether a previously-detected, acceleration-sensor malfunction no longer exists. Various features and advantages of the invention are set forth in the following claims.

What is claimed is:

1. A controller for indicating whether a previously-detected, acceleration-sensor malfunction no longer exists, the controller comprising:
an electronic memory; and
an electronic processing unit connected to the electronic memory, the electronic processing module including,
a malfunction monitoring module configured to monitor the operation of an acceleration sensor and generate a fault signal when an absolute value of an offset value of the acceleration sensor is greater than a first predetermined threshold, the fault signal containing fault information and causing at least one of a tell-tale indicator to be activated or a vehicle control module to modify its operation from a first operating state to a second operating state, a failure handling module configured to cause drive cycle information and the fault information to be stored in the electronic memory, and a signal checking module configured to perform a signal check after the malfunction monitoring module generates the fault signal, the signal check including retrieving drive cycle information from the electronic memory, determining whether to execute a signal check function based on the drive cycle information, executing the signal check function with a longitudinal acceleration signal including the offset value, the signal check function including comparing the absolute value of offset value with a second predetermined threshold smaller than the first predetermined threshold, the predetermined threshold based on a distance traveled which exceeds a predetermined threshold distance, determining the longitudinal acceleration signal passes the signal check function when the absolute value of the offset value is less than the second predetermined threshold, generating a reset signal when the longitudinal acceleration signal passes the signal check function, the reset signal causing at least one of the tell-tale indicator to be deactivated and the vehicle control module to resume operation in the first operating state.

2. A controller as set forth in claim 1, wherein the malfunction monitoring module monitors the operation of the acceleration sensor by detecting a fault with the longitudinal acceleration signal and generates the fault signal in response to the detection of the fault.

3. A controller as set forth in claim 1, wherein executing the signal check function includes comparing the longitudinal acceleration signal with a predetermined threshold.

4. A controller as set forth in claim 3, wherein comparing the longitudinal acceleration signal with the predetermined threshold further includes applying a value of the longitudinal acceleration signal to a filter to generate a filtered value, adjusting the filtered value by an offset to generate an adjusted value, and comparing the adjusted value to the predetermined threshold.

5. A controller as set forth in claim 1, wherein executing the signal check function further includes performing a plausibility check with the longitudinal acceleration signal.

6. A controller as set forth in claim 5, wherein the plausibility check includes comparing a longitudinal acceleration value with a value having a relation to a velocity signal.

7. A controller as set forth in claim 6, wherein the value having the relation to the velocity signal is based on a first order derivative value of the velocity signal, and wherein the comparison includes comparing the longitudinal acceleration value and the first order derivative value.

8. A vehicle including an acceleration sensor connected to the controller of claim 1.

9. A vehicle as set forth in claim 8, wherein the acceleration sensor includes a longitudinal acceleration sensor generating the longitudinal acceleration signal.

10. A method executed by a controller, including an electronic processing unit and an electronic memory, for determining whether a previously-detected, acceleration-sensor malfunction no longer exists, the method comprising:

monitoring the operation of an acceleration sensor with a malfunction monitoring module executed by the electronic processing unit;

generating a fault signal containing fault information with the malfunction monitoring module when the acceleration sensor an absolute value of an offset value of the acceleration sensor is greater than a first predetermined threshold;

causing, at least partially in response to the fault signal, at least one of a tell-tale indicator to be activated or a vehicle control module to modify its operation from a first operating state to a second operating state;

storing drive cycle information and the fault information in the electronic memory with a failure handling module executed by the electronic processing unit; and performing a signal check after generating the fault signal with a signal checking module executed by the electronic processing unit, including retrieving drive cycle information from the electronic memory, determining whether to execute a signal check function based on the drive cycle information, executing the signal check function with a longitudinal acceleration signal having longitudinal acceleration information including the offset value, executing the signal check function including comparing an absolute value of the offset value with a second predetermined threshold, the second predetermined threshold less than the first predetermined threshold and based on a distance traveled which exceeds a predetermined threshold distance, determining the longitudinal acceleration signal passes the signal check function when the absolute value of the offset value is less than the second predetermined threshold, and generating a reset signal when the longitudinal acceleration signal passes the signal check, the reset signal causing at least one of the tell-tale indicator to be deactivated and a vehicle control module to resume operation in the first operating state.

11. A method as set forth in claim 10, wherein the monitoring the operation of the acceleration sensor includes detecting a fault with the longitudinal acceleration signal and generating the fault signal based on the detection of the fault.

12. A method as set forth in claim 10, wherein executing the signal check function includes comparing the longitudinal acceleration signal with a predetermined threshold.

13. A method as set forth in claim 12, wherein comparing the longitudinal acceleration signal with the predetermined threshold further includes applying a longitudinal acceleration value of the longitudinal acceleration signal to a filter to generate a filtered value, adjusting the filtered value by an offset to generate an adjusted value, and comparing the adjusted value to the predetermined threshold.

14. A method as set forth in claim 10, wherein executing the signal check function further includes performing a plausibility check with the longitudinal acceleration signal.

15. A method as set forth in claim 14, wherein the plausibility check includes comparing a longitudinal acceleration value with a value having a relation to a velocity signal.

16. A method as set forth in claim 15 wherein the value having the relation to the velocity signal is a derivative of the velocity signal, and wherein the comparison includes comparing the longitudinal acceleration value and the derivative.

\* \* \* \* \*